(12) United States Patent
Makimura et al.

(10) Patent No.: US 7,339,329 B2
(45) Date of Patent: Mar. 4, 2008

(54) DIMMABLE BALLAST FOR AN ELECTRODELESS DISCHARGE LAMP

(75) Inventors: Shinji Makimura, Kitakatsuragi-gun (JP); Hiroshi Kido, Hirakata (JP); Shingo Masumoto, Hirakata (JP); Yuji Kumagai, Osaka (JP); Akira Nakajo, Kyoto (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/544,720

(22) PCT Filed: Nov. 21, 2003

(86) PCT No.: PCT/JP03/14951

§ 371 (c)(1),
(2), (4) Date: Aug. 25, 2006

(87) PCT Pub. No.: WO2004/073360

PCT Pub. Date: Aug. 26, 2004

(65) Prior Publication Data

US 2006/0290294 A1    Dec. 28, 2006

(30) Foreign Application Priority Data

Feb. 14, 2003    (JP) ............................... 2003-036518

(51) Int. Cl.
*H05B 41/24*    (2006.01)

(52) U.S. Cl. .................. 315/248; 315/307; 315/DIG. 4

(58) Field of Classification Search ................ 315/248, 315/291, 307, 308, DIG. 4, 224, DIG. 5, 315/DIG. 7
See application file for complete search history.

(56) References Cited

U.S. PATENT DOCUMENTS 5,243,261 A * 9/1993 Bergervoet et al. ......... 315/248

(Continued)

FOREIGN PATENT DOCUMENTS

EP     0 498 497 A2    8/1992

(Continued)

OTHER PUBLICATIONS

Communication pursuant to Article 96(2) EPC—Appln. No.: 03 774 163.4—2206—Applicant: Matsushita Electric Works, Ltd., Jun. 8, 2007, 5 pages.

*Primary Examiner*—Douglas W. Owens
*Assistant Examiner*—Ephrem Alemu
(74) *Attorney, Agent, or Firm*—Edwards Angell Palmer & Dodge LLP

(57) ABSTRACT

A ballast for an electrodeless discharge lamp includes a high frequency power supply that supplies a high frequency electric power to an induction coil for operating the lamp. A dimmer controller generates a control signal in response to a dimmer command designating a varying dimming ratio. The control signal defines a first period Ton in which the power supply is controlled to apply a coil voltage of a first level V1 to the induction coil for operating the lamp. The first period is followed by a second period Toff in which the power supply is controlled to apply the coil voltage of a second level V2 that is lower than the first level and fails to sustain the lamp. The control signal defines, between the second period and the first period, a starting period Tst in which the coil voltage increases continuously for smooth transition from an off-condition to an on-condition of the lamp.

17 Claims, 9 Drawing Sheets

U.S. PATENT DOCUMENTS 5,424,616 A * 6/1995 Reijnaerts .................... 315/248
5,561,351 A * 10/1996 Vrionis et al. .............. 315/248
5,874,810 A * 2/1999 Nerone ....................... 315/248
6,175,198 B1    1/2001 Nerone ....................... 315/291
6,392,366 B1 * 5/2002 Nerone ................. 315/DIG. 4
6,828,740 B2 * 12/2004 Takahashi et al. .......... 315/307

FOREIGN PATENT DOCUMENTS

JP          6-283293         10/1994
WO      WO 02/098186 A1     12/2002

* cited by examiner

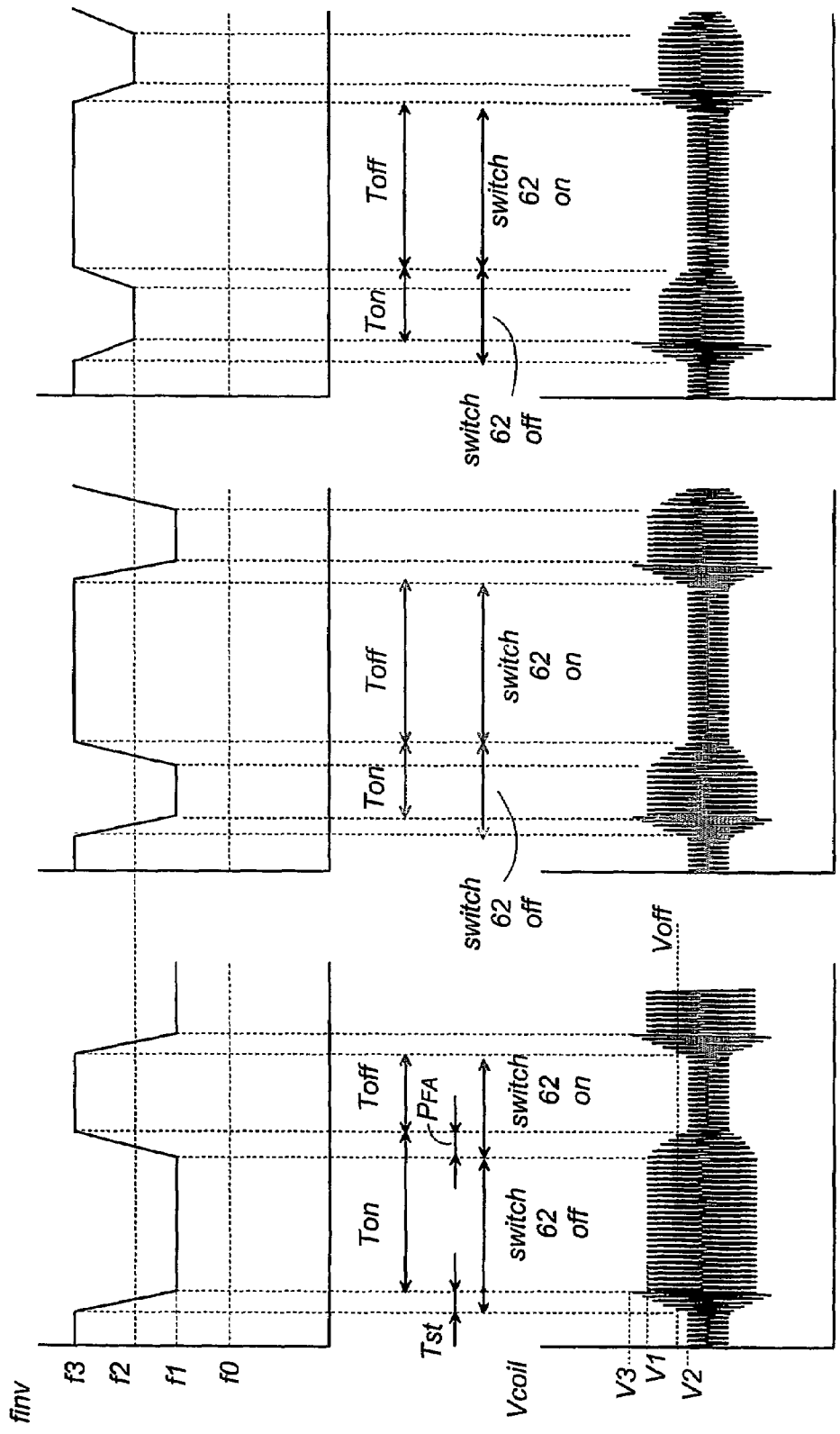

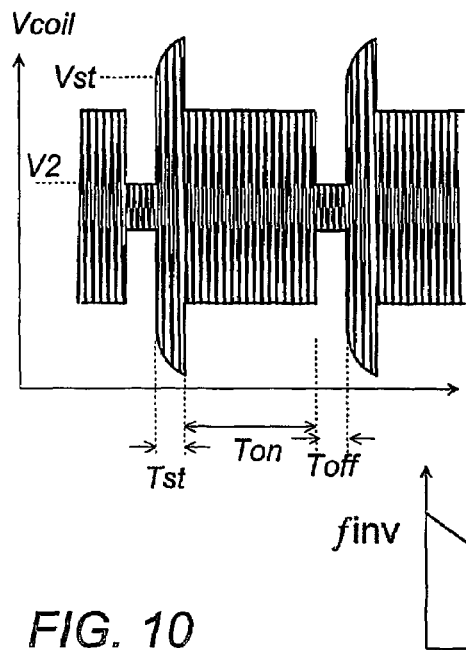
FIG. 8A
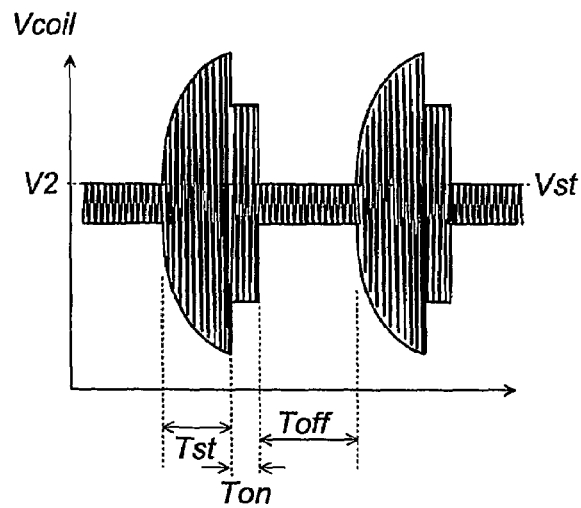
FIG. 8B
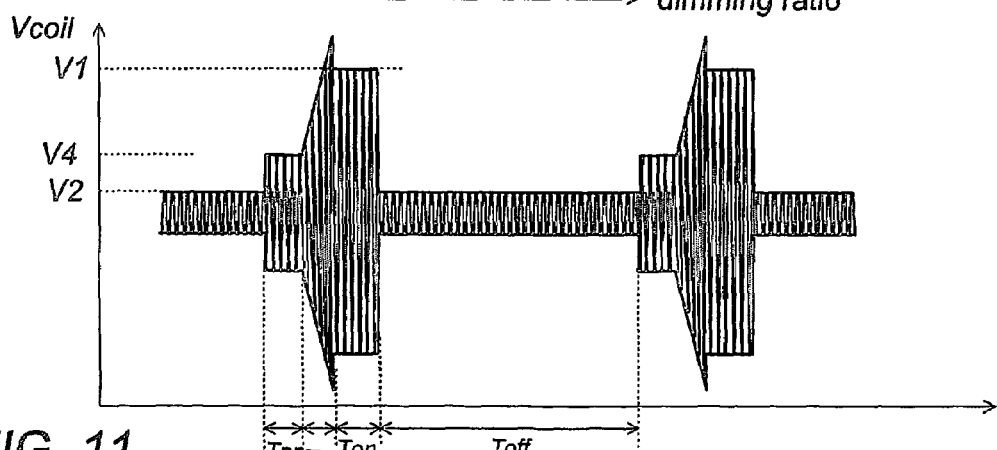
FIG. 9
FIG. 10
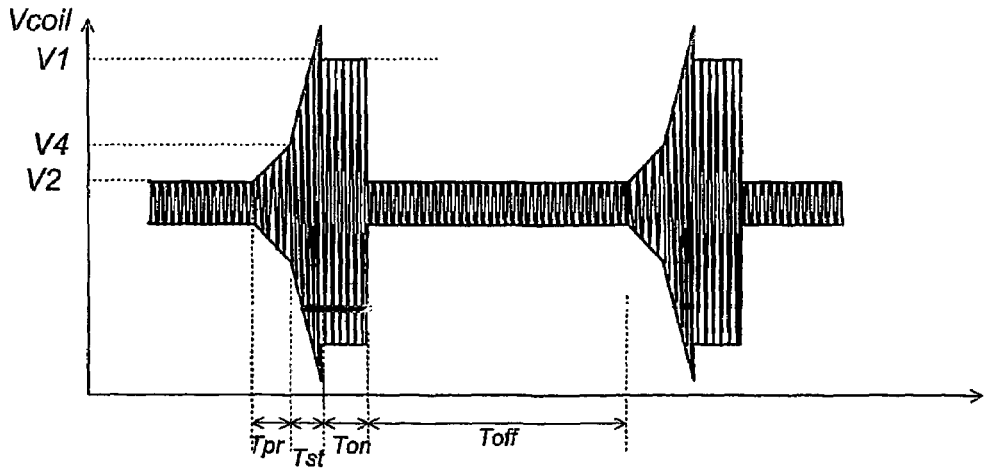
FIG. 11

DIMMABLE BALLAST FOR AN ELECTRODELESS DISCHARGE LAMP

This application is a 371 of PCT/JP03/14951 filed Nov. 21, 2003 which claims priority of JP 2003-036518 filed Feb. 14, 2003.

1. Technical Field

The present invention relates to a ballast for an electrodeless discharge lamp, and more particularly to the ballast having a lamp dimming capability.

2. Background Art

U.S. Pat. No. 6,175,198 discloses a prior art ballast for operating the electrodeless discharge lamp having a lamp dimming capability. The ballast includes an induction coil disposed adjacent to the lamp, and a high frequency power supply that supplies a high frequency electric power to the induction coil for operating the lamp. Also included in the ballast is a dimmer controller that controls the power supply to vary a coil voltage being applied to the induction coil for dimming the lamp, in response to a dimmer command designating a dimming ratio, i.e., the ratio of rated luminance to an actual luminance. In order to dim the lamp, the dimmer controller is configured to repetitively turn on and off the lamp at a varying duty ratio in match with the dimming ratio. In other words, the ballast is designed to alternately provide a first time period in which the lamp is turned on and a second time period in which the lamp is turned off. In the first period, the coil voltage is fixed to a high level sufficient to start and sustain the lamp, while the coil voltage in the second period is set to a low level not sustaining the lamp. Although the above control scheme is found successful for dimming the lamp, there remains a problem in that the ballast sees an abrupt increase of the coil voltage at the very beginning of the first period, which would cause undesired noises, and therefore the prior ballast is not completely satisfactory.

DISCLOSURE OF THE INVENTION

In view of the above insufficiency the present invention has been accomplished to provide an improved ballast for an electrodeless discharge lamp. The ballast in accordance with the present invention includes an induction coil adapted in use to be disposed adjacent the discharge lamp, and a high frequency power supply that supplies a high frequency electric power to the induction coil for operating the lamp. A dimmer controller is included to generate a control signal in response to a dimmer command designating a varying dimming ratio. The control signal defines a first period in which the power supply is controlled to apply a coil voltage of a first level to the induction coil for operating the lamp. The first period is followed by a second period in which the power supply is controlled to apply the coil voltage of a second level that is lower than the first level and fails to sustain the lamp. The control signal generated from the dimmer controller is characterized to define, between the second period and the first period, a starting period in which the coil voltage increases continuously. Thus, the lamp can be started only at a minimum noise so as to be smoothly changed from the off-condition to the on-condition, thereby assuring a successful lamp dimming with the minimum noise.

Preferably, the control signal increases, within the starting period, the coil voltage continuously from the second level to a third level higher than the first level for successfully starting the lamp.

Also, the control signal is preferred to define, in the end of the first period, a falling phase in which the coil voltage decreases continuously towards the second level. Whereby, the lamp can be smoothly changed from the on-condition to the off condition, reducing the noise also at this transition.

Basically, the control signal is configured to decrease a duty ratio of the first period as the dimming ratio decreases to lower the luminance of the discharge lamp. Alternatively or in combination with the control of the duty ratio of the first period, the control signal may be configured to decrease the coil voltage of the first level as the dimming ratio decreases.

Preferably, the control signal is defined to decrease the duty ratio of the first period as the dimming ratio decreases to lower the luminance of the lamp to a predetermined level, and to decrease the coil voltage of the first period and the duty ratio as the dimming ratio decreases to lower the luminance further beyond the predetermined level. With this arrangement, it is easy to dim the lamp to a deep extent, i.e., over a wide dimming range from the full luminance to a minimum luminance of the lamp.

Further, the control signal may be configured to increase the coil voltage of the second period as the dimming ratio decreases. Thus, the lamp can keep residual plasma at a relatively high level even in the second period, i.e., in the off-condition, such that the lamp can be successfully started by being applied the coil voltage of the first level in the immediately subsequent first period. Therefore, the lamp can be successfully dimmed to a deep extent.

In this connection, it is also preferred that the control signal is defined to decrease the duty ratio as the dimming ratio decreases to a predetermined level, and to increase the coil voltage of the second period and to decrease the duty ratio as the dimming ratio decreases further beyond the predetermined level.

Further, the control signal may be configured to increase the coil voltage at the beginning of the starting period as the dimming ratio increases. Thus, the lamp can be started rapidly as the dimming ratio increases, which makes it possible to vary the duty ratio of the first period to a large extent and accordingly to assure the lamp dimming over a wide range.

In addition, the control signal may further define a pre-starting period immediately preceding the starting period. During the pre-starting period, the coil voltage increases within a range between the second level and the first level as the dimming ratio decreases. The coil voltage may increase continuously from the second level in the pre-starting period for smooth transition from the second period to the pre-starting period.

When the control signal is made to increase, within the starting period, continuously from the second level to a third level higher than the first level, it is preferred to increase the third level as the dimming ratio decreases in order to start the lamp rapidly and successfully even at a lowered dimming ratio. Also in this connection, the control signal is preferred to decrease the coil voltage of the first level continuously from the third level during the first period.

The high frequency power supply is preferred to have a resonant circuit which generates the coil voltage determined by a driving frequency applied to the resonant circuit. For regulating the coil voltage supplied from the high frequency power supply, the control signal is configured to vary the driving frequency in response to the varying dimming ratio. The driving frequency is preferred to be within several tens of kHz to several MHz, permitting the induction coil as well as the associated parts to be made compact.

The ballast may further include a DC power supply providing a DC voltage input to the high frequency power supply. In this sense, the control signal may be configured to vary the DC voltage input alone or in combination with the driving frequency.

These and still other objects and advantageous features of the present invention will become more apparent from the following detailed description of the preferred embodiments when taken in conjunction with the attached drawings.

BRIEF DESCRIPTION OF THE DRAWINGS

FIGS. 3A to 3C are waveform charts illustrating a control signal for dimming the lamp at different dimming ratios, respectively;

FIGS. 4A to 4C are waveform charts illustrating the coil voltage applied to the lamp for different dimming ratios, respectively corresponding to FIGS. 3A to 3C;

FIGS. 8A and 8B are waveform charts illustrating the coil voltage varying in accordance with a still further control scheme;

FIG. 9 is a graph illustrating the above control scheme;

FIGS. 10 and 11 are waveform charts of the coil voltage in accordance with further control schemes;

BEST MODE FOR CARRYING OUT THE INVENTION

Figure 1:
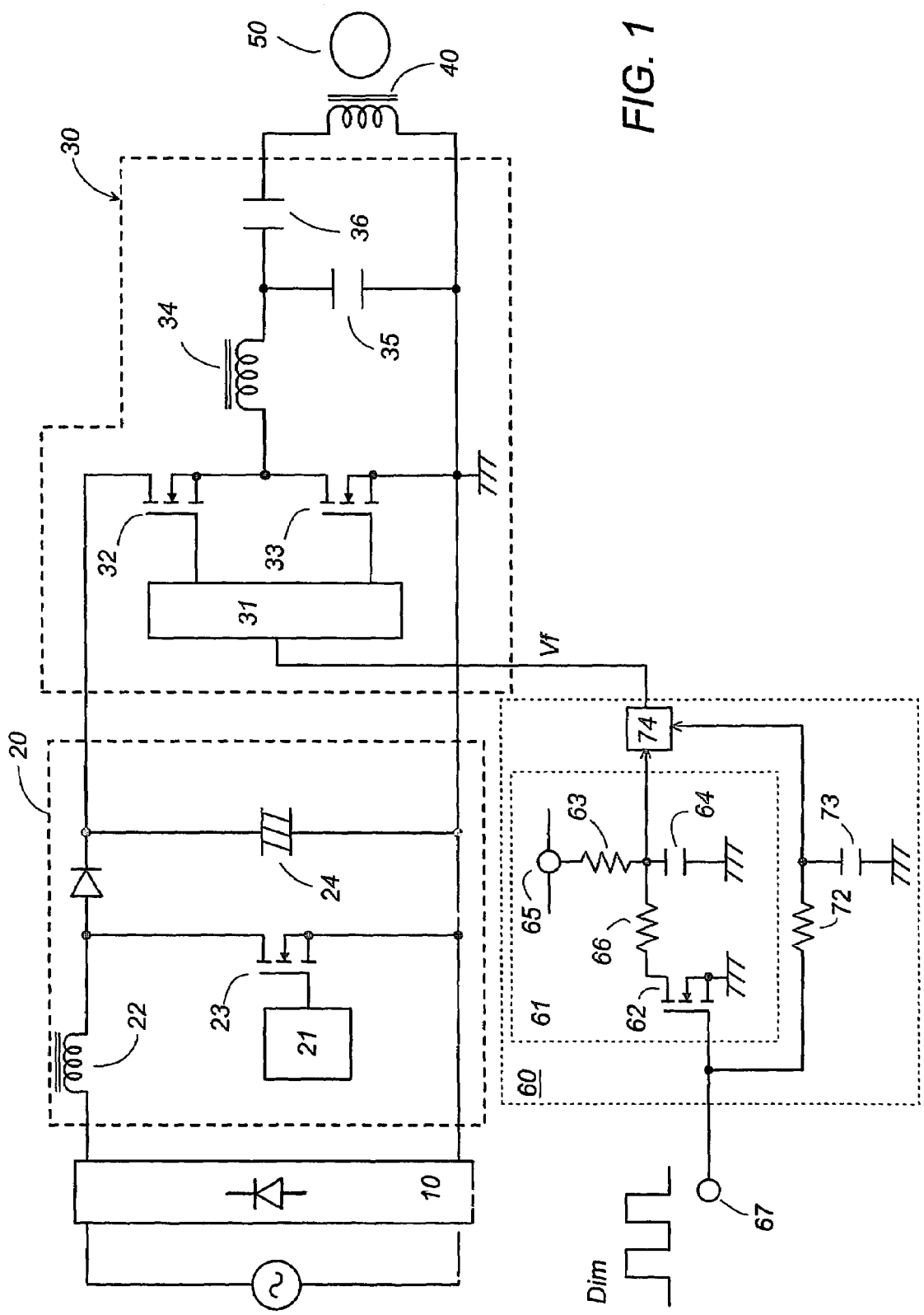
FIG. 1 is a circuit diagram of a ballast for an electrodeless discharge lamp in accordance with a preferred embodiment of the present invention.

Referring now to FIG. 1, there is shown an electronic ballast for an electrodeless lamp in accordance with a preferred embodiment of the present invention. The ballast includes an induction coil 40 adapted in use to be disposed adjacent to the electrodeless discharge lamp 50 for supplying the electric power to the lamp. The ballast is designed for dimming the lamp, i.e., adjusting the luminance of the lamp, and includes a rectifier 10 providing a rectified DC voltage from an AC voltage source, a DC voltage regulator 20 providing a regulated DC voltage, and a high frequency power supply, i.e., an inverter 30 powered by the output of the DC voltage regulator 20 to supply a high frequency AC power to the discharge lamp 50. The inverter 30 includes a resonant circuit through which the high frequency AC power is supplied to the discharge lamp 50.

The DC voltage regulator 20 is in the form of a conventional chopper having an inductor 22 and a switching element 23 which is driven to turn on and off repetitively so as to store an energy in the inductor 22 while the switching element 23 is on and to release the energy, i.e., the DC voltage into a smoothing capacitor 24 while the switching element 23 is off, thereby regulating the output DC voltage accumulated across the smoothing capacitor 24. A driver 21 is included to drive the switching element 23 in order to give the constant output DC voltage to the inverter 30.

The inverter 30 is of a conventional design having switching transistors 32 and 33 which are driven to turn on and off at a high frequency to convert the DC voltage into the high frequency AC power which is supplied through the resonant circuit of an inductor 34 and capacitors 35 and 36 for operating the lamp 50. A driver 31 is controlled by a dimmer controller 60 to turn on and off the switching transistors 32 and 33 at a varying frequency for dimming the lamp 50. That is, the dimmer controller 60 gives a control signal Vf to the driver 31 for dimming the lamp in accordance with an external dimmer command designating the dimming ratio of a rated luminance of the lamp to an actual luminance. The control signal Vf is a voltage signal determining a driving frequency at which the inverter 30 is driven to apply a coil voltage Vcoil across the induction coil 40. For this purpose, the dimmer controller 60 includes a main controller 61 composed of a switch 62, a resistor 63 and a capacitor 64 connected in series with the resistor 63 across a fixed voltage source 65. The switch 62 is controlled to turn on and off in response to the external dimmer command Dim received at an input 67 to vary the output voltage of the control signal Vf. The external dimmer command is a pulse-width modulated signal having a duty ratio inversely proportional to the dimming ratio.

Figure 2:
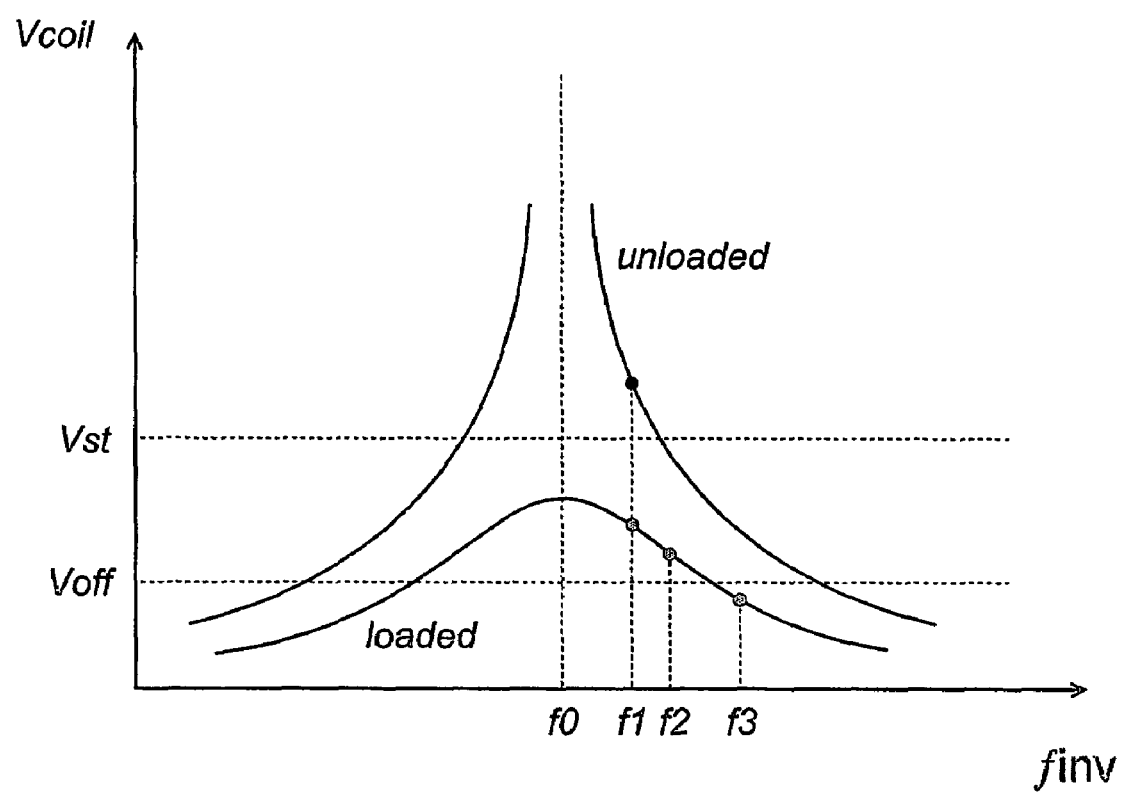
FIG. 2 is a graph illustrating a basic function of varying a coil voltage by a frequency shift utilized in the present invention.

Prior to discussing the functions of the dimmer controller 60, it should be noted that the lamp dimming is made by repetitively turning on and off the lamp 50 basically at a varying duty ratio corresponding to the dimming ratio. For this purpose, the control signal Vf defines a first period Ton of turning on the lamp 50 which is followed by a second period Toff of turning off the lamp. The first period Ton and the second period Toff are defined in terms of the driving frequency finv, as will be discussed hereinafter. That is, the control signal determines the driving frequency of the inverter 30 such that the driving frequency finv increases within a range higher than a resonant frequency f0 as the output voltage of the control signal Vf is lowered. As shown in FIG. 2 with regard to a relation between the driving frequency finv and the resulting coil voltage Vcoil applied to the induction coil 40, the ballast utilizes the driving frequency finv varying within the range from f1 to f3 for dimming the lamp. When the lamp is off or the ballast is unloaded, frequency f1 gives the coil voltage Vcoil higher than a starting voltage Vst required to start the lamp. When the lamp has been started or the ballast is loaded, frequency f1 gives the coil voltage higher than an extinction voltage Voff below which the lamp is extinguished, so as to keep the lamp turned on. Frequency f2 (>f1) gives the coil voltage Vcoil still higher than the extinction voltage Voff but lower than that obtained at frequency f1. Frequency f3 (>f2) is selected to give the coil voltage Vcoil lower than the extinction voltage Voff to thereby turn off the lamp. Thus, the control signal Vf determines the duty ratio of the first period Ton in match with the dimmer command Dim for dimming the lamp.

Turning back to FIG. 1, the details of the dimmer controller 60 will be now discussed. While the dimmer command Dim is at a high level, switch 62 is turned on to lower the output voltage of the control signal Vf, i.e., the voltage across capacitor 64, thereby increasing the driving frequency up to f3, which in turn lowers the coil voltage Vcoil below Voff to turn off the lamp. When the dimmer command Dim goes low, switch 62 is turned off so that capacitor 64 starts being charged to give the increasing output voltage Vf, which in turn decreases the driving frequency finv from f3 to f1 and therefore increases the coil voltage Vcoil for starting the lamp. The time period where the driving frequency finv decreases from f3 to f1 defines a starting period Tst which, as shown in FIGS. 3A to 3C and 4A to 4C, precedes immediately the first period Ton and in which the coil voltage Vcoil increases from a second voltage V2 below the extinction voltage Voff and settles to a first voltage V1 above the extinction voltage Voff after going through a third voltage V3 higher than the second voltage V2 as well as higher than the starting voltage Vst. As a result of that the control signal Vf increases continuously, the coil voltage Vcoil increases continuously in the starting period Tst, which contributes to reduce a noise each time the lamp is started, thereby assuring to make the noiseless lamp dimming.

A resistor 66 is connected in series with switch 62 across capacitor 64 so as to decrease the voltage of the control signal gradually and therefore gradually increase the driving frequency finv, giving in the end of the first period Ton a falling phase $P_{FA}$ during which the coil voltage Vcoil decreases continuously from the first level V1 to the second level V2, as shown in FIGS. 4A to 4C. Thus, it is made to lessen a noise also at the transition from the first period Ton to the second period Toff.

The dimmer controller 60 also includes an integrated circuit composed of resistor 72 and capacitor 73 which smoothes the dimmer command Dim to provide a resulting signal to a level adjustor 74. The level adjustor 74 is configured to vary the driving frequency finv in such a manner as to lower the coil voltage Vcoil during the first period Ton as the dimming ratio decreases beyond a predetermined level. That is, the level adjustor 74 acts to give a first dimming mode of varying the duty ratio of the first period Ton based upon the output from the main controller 61 while the dimming ratio is within a high level range above the predetermined level, and to give a second dimming mode of varying the coil voltage Vcoil only during the first period Ton, in addition to varying the duty ratio of the first period Ton, based upon a combination of the output from the main control 61 and the output from the integrating circuit while the dimming ratio is lowered beyond the predetermined level. In the first dimming mode, the driving frequency finv is caused to vary between f3 to f1 to vary the coil voltage Vcoil mainly between V2 and V1 in a pattern determined by the varying duty ratio of the first period Ton, as shown in FIGS. 3A and 3B, and FIGS. 4A and 4B. In the second dimming mode, the driving frequency finv is caused to vary between f3 to f2 to thereby vary the coil voltage in the first period Ton, as shown in FIGS. 3B and 3C, and FIGS. 4B and 4C. With this two-way dimming, a deep dimming is made available to expand the lamp dimming range. In this connection, the second dimming mode may be defined to decrease the coil voltage Vcoil in the first period Ton as the dimming ratio decreases past the predetermined level, but without varying the duty ratio of the first period Ton.

Figure 5A:
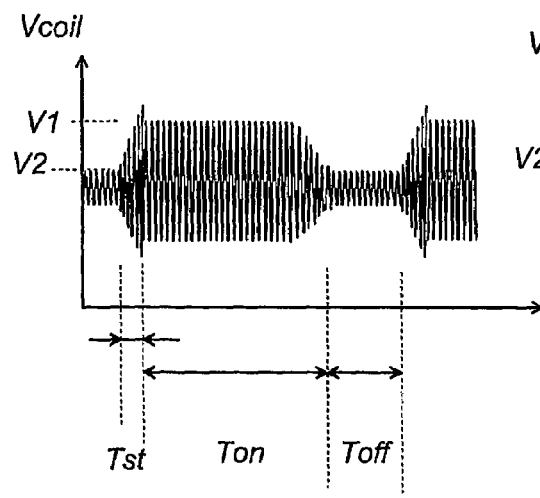
FIGS. 5A and 5B are waveform charts illustrating the coil voltage for dimming the lamp in accordance with an alternative control scheme.
Figure 5B:
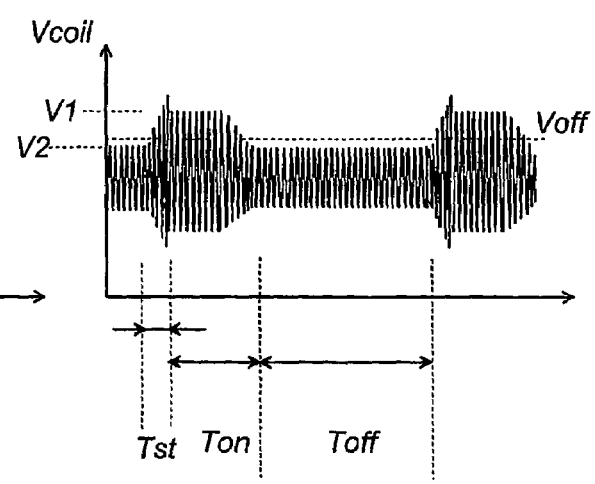

Alternatively or in addition to the above control scheme, the level adjustor 74 may be configured to give the second dimming mode in which the coil voltage Vcoil of the second period Toff increases within a range below the extinction voltage Voff as the dimming ratio decreases beyond the predetermined level. That is, while the dimming ratio is within the high level, the coil voltage Vcoil is caused to vary in a pattern determined by the varying duty ratio of the first period Ton, as shown in FIG. 5A. When the dimming ratio is lowered below the predetermined level, the coil voltage Vcoil is caused to vary during the second period Toff, i.e., to increase as the dimming ratio decreases further beyond the predetermined level, as shown in FIG. 5B in comparison with FIG. 5A. With this control scheme of increasing the coil voltage Vcoil during the second period Toff in proportion to a decreasing dimming ratio after the dimming ratio decreases beyond the predetermined level, it is possible to reduce a starting voltage at the following first period Ton as compared to a case in which the coil voltage is fixed to a small level. This is because of that the lamp can retain much residual plasma inside thereof when it is supplied with the increased voltage during the second period Toff. In this connection, it is also possible to increase the coil voltage Vcoil during the second period Toff without further decreasing the duty ratio of the first period Ton, when the dimming ratio decreases further beyond the predetermined level.

Figure 6A:
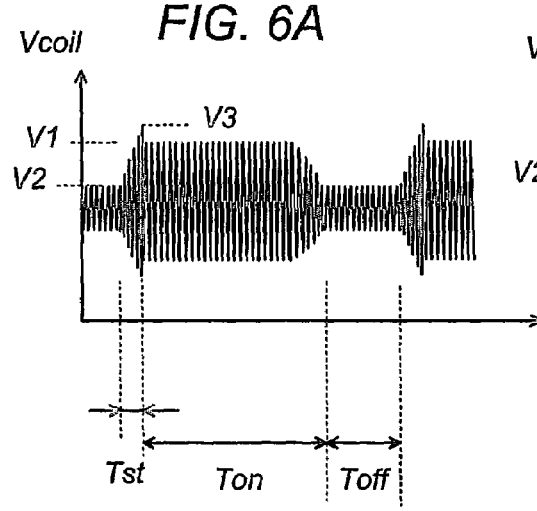
FIGS. 6A and 6B are waveform charts illustrating the coil voltage varying in accordance with another control scheme.
Figure 6B:
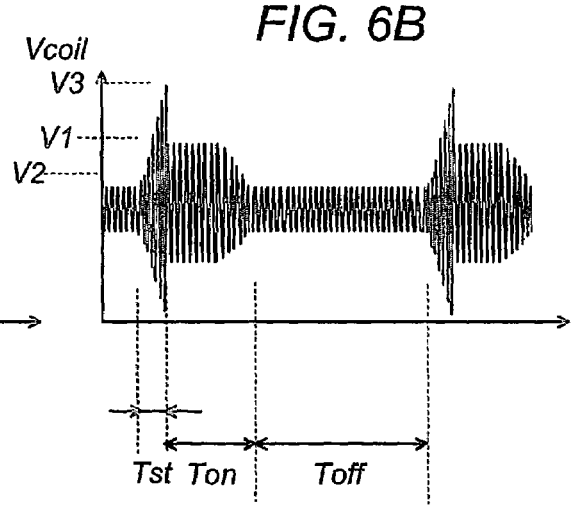

FIGS. 6A and 6B illustrate a further control scheme of increasing a maximum coil voltage V3 appearing at the end of the starting period Tst as the dimming ratio decreases beyond a predetermined level in order to successfully start the lamp even after a prolonged second period Toff in which the lamp is turned off. That is, the control signal from the dimmer controller 60 causes the inverter 30 to give a maximum coil voltage V3 that increases as the dimming ratio decreases beyond the predetermined level.

Figure 7A:
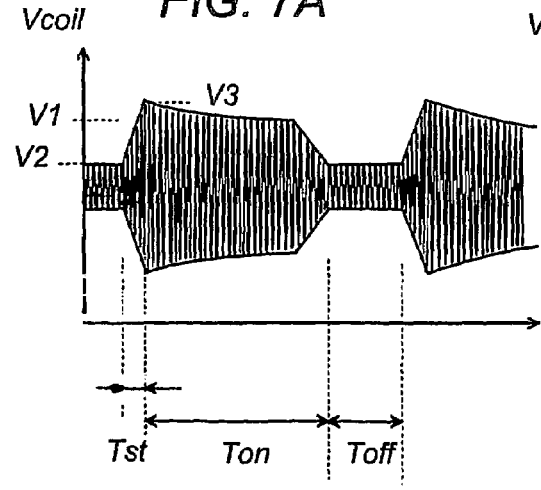
FIGS. 7A and 7B are waveform charts illustrating the coil voltage varying in accordance with a further control scheme.
Figure 7B:
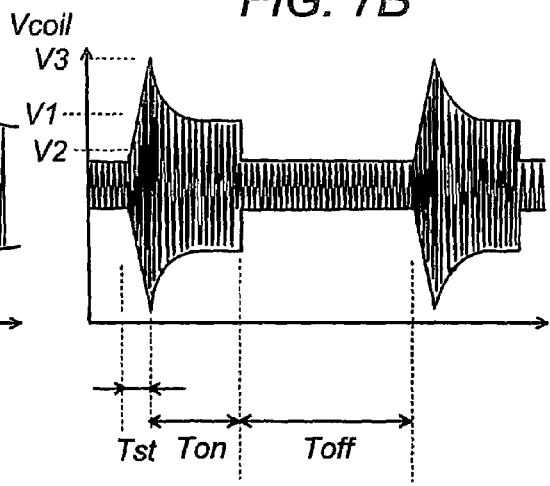

FIGS. 7A and 7B illustrate a further control scheme of decreasing the coil voltage Vcoil continuously from the end of the starting period Tst to the end of the first period Ton, in addition to increasing the maximum coil voltage V3 as the dimming ratio decreases beyond the predetermined level. This scheme is also advantageous for reducing harmonic noises at the change of the driving frequency finv corresponding to the change of the coil voltage Vcoil from V3 of the starting period Tst to V1 of the first period Ton. In the above embodiment and modifications, it is preferred to vary the coil voltage Vcoil during the first period Ton or the second period Toff, in addition to varying the duty ratio of the first period Ton, after the dimming ratio decreases beyond the predetermined level. However, it is also possible to vary the coil voltage Vcoil during the first period Ton or the second period Toff, without varying the duty ratio of the first period Ton, after the dimming ratio decreases further beyond the predetermined level, or to give an additional lowered level below which only the coil voltage is varied at a fixed duty ratio of the first period Ton.

FIGS. 8A and 8B illustrate a still further control scheme of varying the coil voltage Vcoil at the beginning of the starting period Tst as well as the width of the starting period Tst depending upon the dimming ratio. FIG. 8A shows the coil voltage Vcoil applied to the lamp when the dimming ratio is within a high level range, in which a starting coil voltage Vst at the beginning of the starting period Tst is increased and the starting period Tst is made narrower as the dimming ratio increases for starting the lamp rapidly and successfully, thereby giving a wide range in which the width of the first period Ton, i.e., the duty ratio of the first period Ton varies, and therefore enabling a delicate dimming control also at the high dimming ratio. FIG. 8B shows the coil voltage Vcoil when the dimming ratio is within a low level range in which the starting coil voltage Vst at the beginning of the starting period Tst is lowered to V2 of the second period Toff and the starting period Tst is made wider as a result of the decreasing dimming ratio. Thus, the lamp can be started successfully through an elongated starting period Tst. For this purpose, the driving frequency finv giving the starting coil voltage Vst is selected to be directly proportional to the dimming ratio, as shown in FIG. 9, to lower the starting coil voltage Vst as the dimming ratio decreases.

FIG. 10 illustrates a still further control scheme which is available in the above embodiment and is characterized to have a pre-starting period Tpr immediately preceding the starting period Tst for successfully starting the lamp even at the lowered dimming ratio. For this purpose, the control signal from the dimmer controller 60 gives the pre-starting period Tpr in which the coil voltage V4 increases, within a range between the voltage V2 of the second period Toff and the operating voltage V1 of the first period Ton, as the dimming ratio decreases. With the provision of the pre-starting period Tpr, a certain amount of plasma can develop inside the lamp so as to be ready for starting the lamp immediately upon being supplied with the starting coil voltage in the following starting period Tst, thereby successfully starting the lamp even at the lowered dimming ratio. In this connection, the coil voltage V4 of the pre-starting period Tpr can be made to increase continuously from the end of the second period Toff to the starting period Tst, as shown in FIG. 11.

Figure 12:
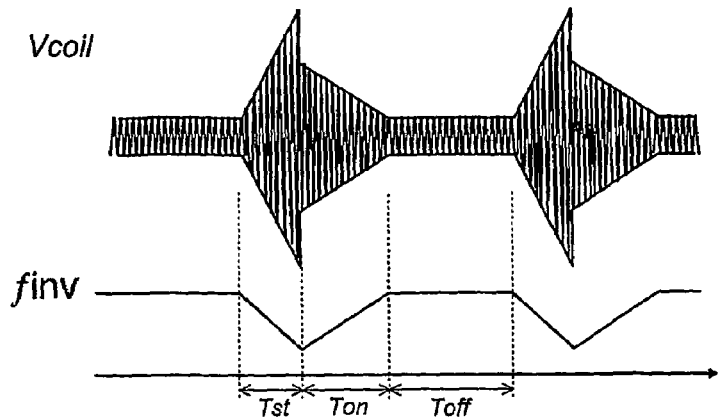
FIG. 12 is a waveform chart illustrating the coil voltage and the control signal for dimming the lamp in accordance with a further control scheme.
Figure 13:
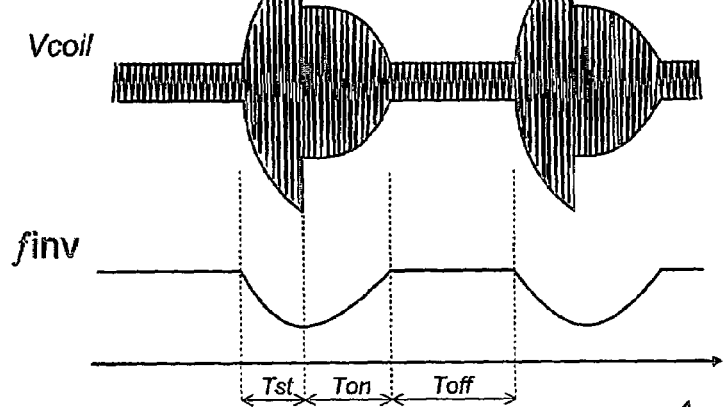
FIG. 13 is a waveform chart illustrating the coil voltage and the control signal for dimming the lamp in accordance with a further control scheme.

FIG. 12 illustrates a modified dimming control which is identical to the above embodiment except that the control signal gives the driving frequency finv that varies continuously over the starting period Tst and the first period Ton to provide the necessary coil voltage Vcoil at the respective periods. Since the control signal defines thus continuously varying driving frequency finv, it is possible to reduce noises developed at the lamp. Alternatively, the driving frequency finv can be made to vary along a curved line as shown in FIG. 13.

Figure 14:
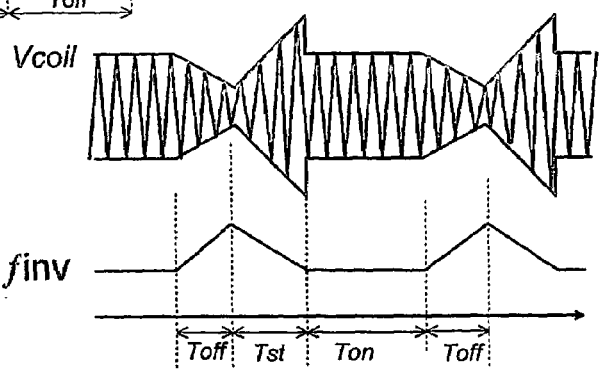
FIG. 14 is a waveform chart illustrating the coil voltage and the control signal for dimming the lamp in accordance with a further control scheme.
Figure 15:
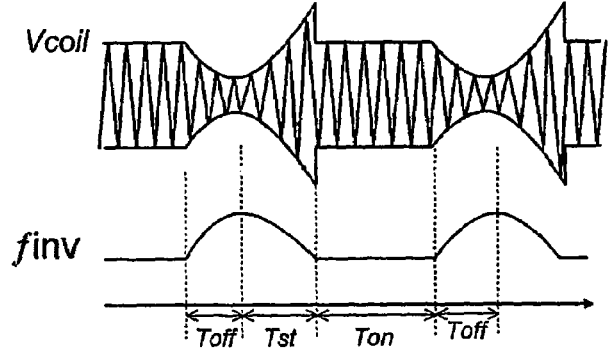
FIG. 15 is a waveform chart illustrating the coil voltage and the control signal for dimming the lamp in accordance with a further control scheme.

In another modification of the above embodiment, it is made to vary the driving frequency finv over the second period Ton and the starting period Tst, as shown in FIGS. 14 and 15.

Figure 16:
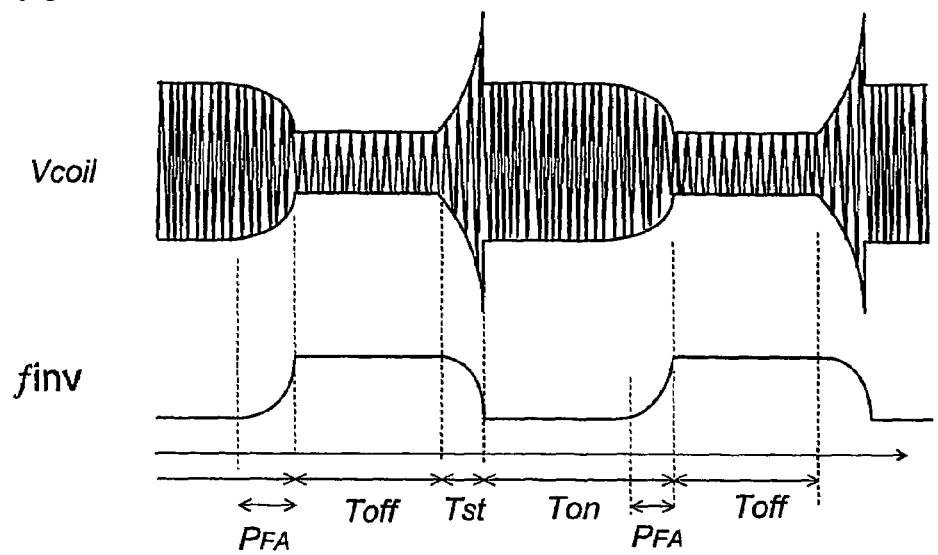
FIG. 16 is a waveform chart illustrating the coil voltage and the control signal for dimming the lamp in accordance with a further control scheme.
Figure 17:
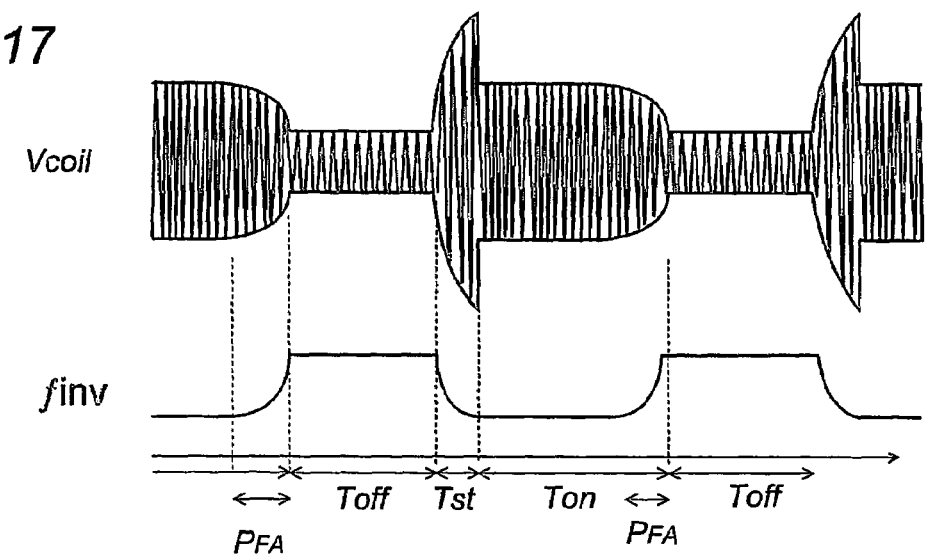
FIG. 17 is a waveform chart illustrating the coil voltage and the control signal for dimming the lamp in accordance with a further control scheme.

FIGS. 16 and 17 illustrate further modified dimming controls which are identical to the above embodiment except that the control signal gives the driving frequency finv which varies continuously along exponential curves respectively during the falling phase Pfa in the end of the first period Ton and during the starting period Tst.

Figure 18:
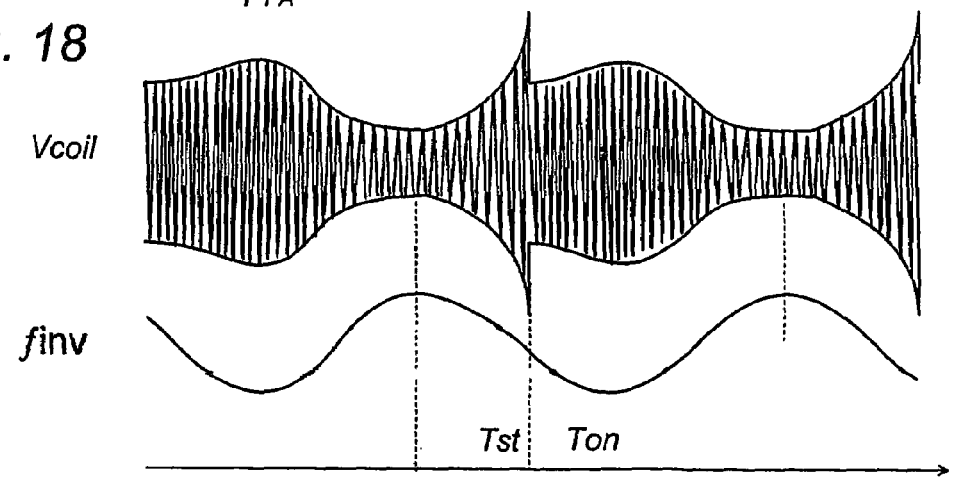
FIG. 18 is a waveform chart illustrating the coil voltage and the control signal for dimming the lamp in accordance with a further control scheme.

FIG. 18 illustrates a still further modified dimming control which is identical to the above embodiment except that the control signal gives the driving frequency finv which varies continuously along a sinusoidal curve over the entire period ranging from the starting period Tst, through the first period Ton, to the second period Toff. In this modification, the lamp dimming is made by shifting the driving frequency finv in accordance with the varying dimming ratio.

Figure 19A:
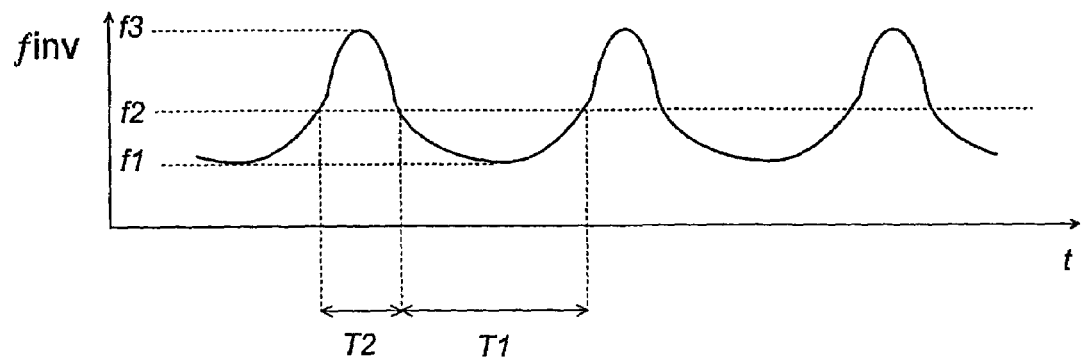
FIGS. 19A and 19B are respectively waveform charts illustrating the control signal for dimming the lamp in accordance with further control schemes.
Figure 19B:
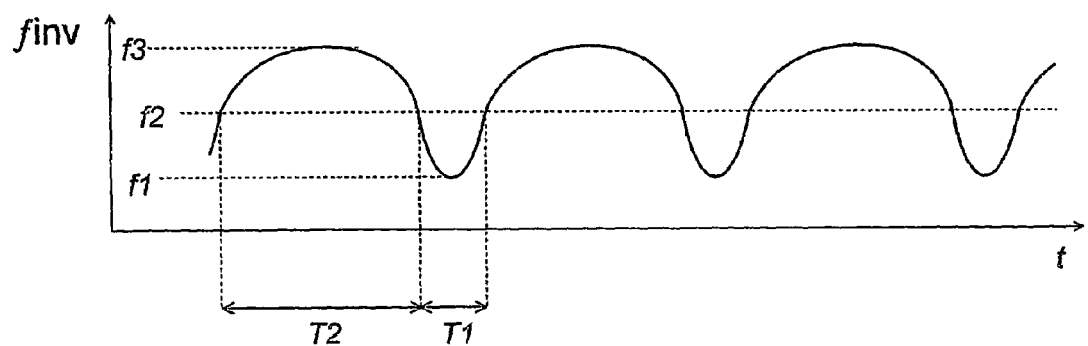

Instead of shifting the driving frequency finv, it is possible to make the lamp dimming by shaping the waveform of the driving frequency finv that varies continuously over the entire period, as shown in FIGS. 19A and 19B. The driving frequency finv is defined to have a period T1 where the frequency is between f2 and f1 (f1<f2) and a period T2 where the frequency is between f2 and f3 (f2<f3). As the dimming ratio increases, the duty ratio of T1 increases, as shown in FIG. 19A which corresponds to a high dimming ratio. While on the other hand, the duty ratio of T1 decreases as the dimming ratio decreases, as shown in FIG. 19B corresponding to a low dimming ratio.

Figure 20:
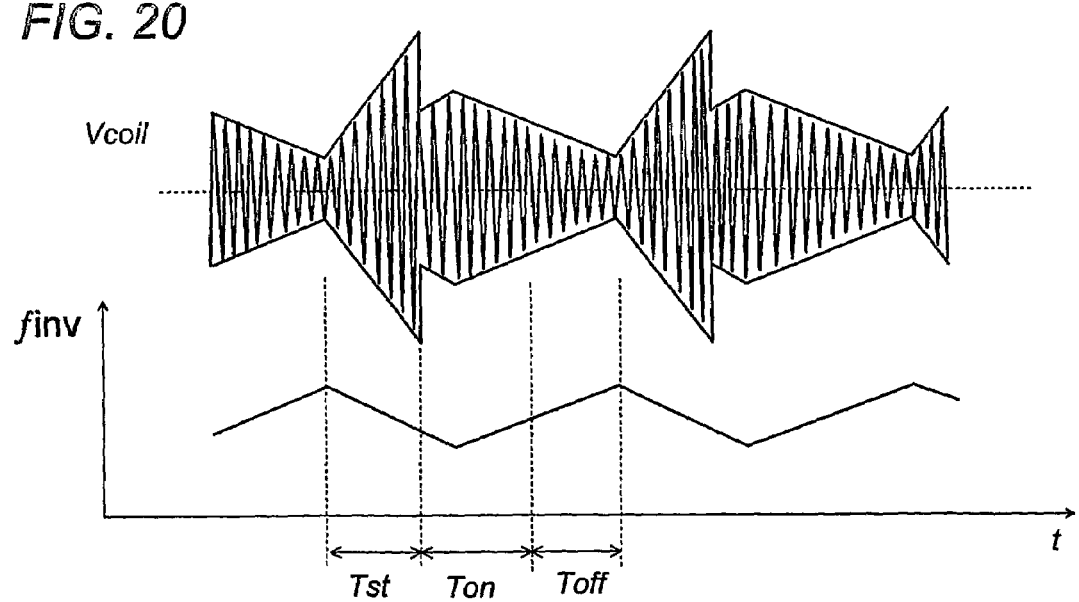
FIG. 20 is a waveform chart illustrating the coil voltage and the control signal for dimming the lamp in accordance with a further control scheme.

FIG. 20 illustrates a further modification of the control scheme which is identical to the above embodiment except that the control signal gives the driving frequency finv of a triangular waveform defining the starting period Tst followed by the first period Ton and the second period Toff.

Figure 21:
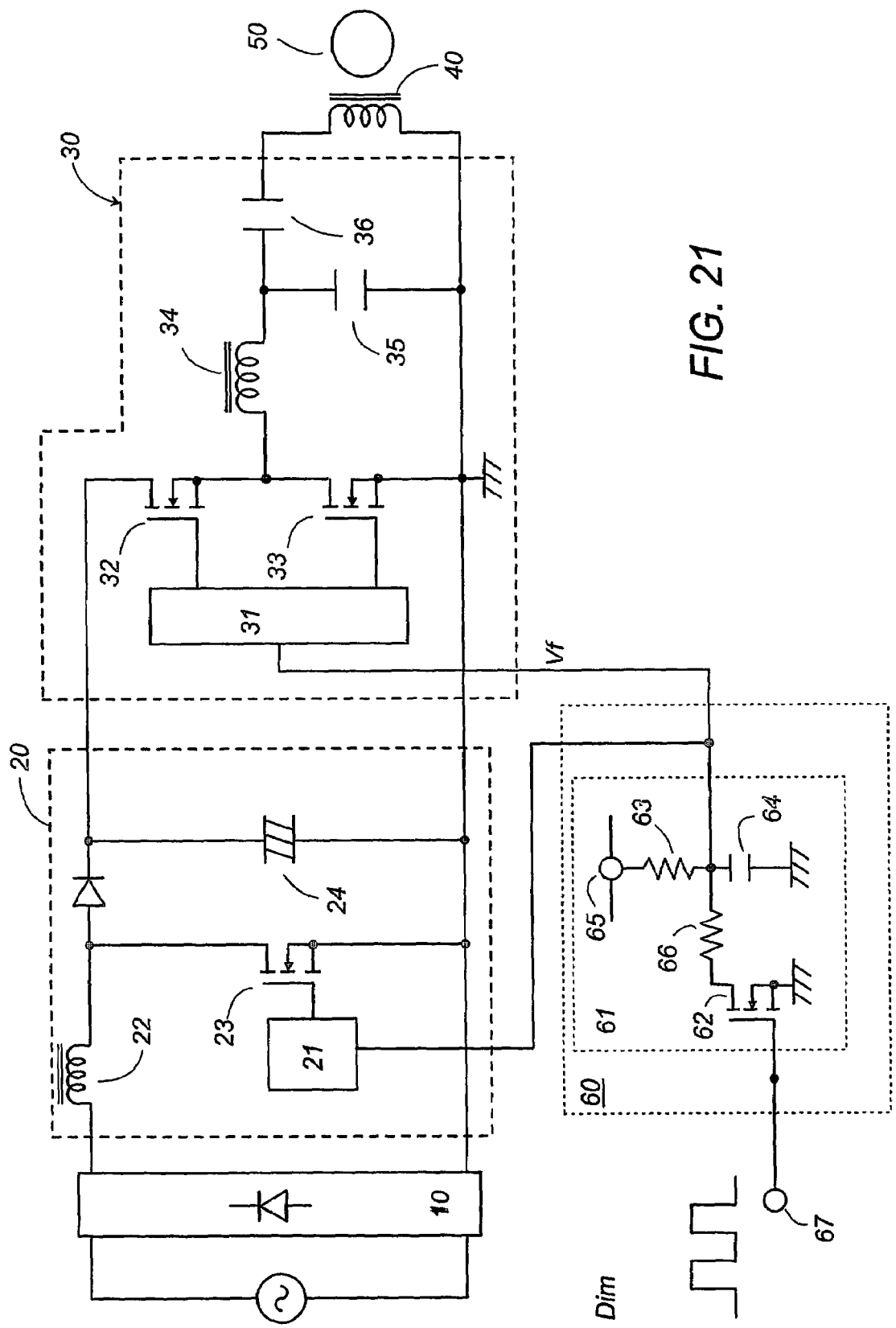
FIG. 21 is a circuit diagram of a ballast in accordance with a modification of the present invention.

Although the above preferred embodiment discloses to vary the coil voltage Vcoil by varying the driving frequency finv given to the inverter 30, the present invention is not limited to this particular realization, and may be configured to vary the output of the DC voltage regulator 20 alone or in combination with the driving frequency, as show in FIG. 21. In the figure, the dimmer controller 60 is shown to give the control signal determining a voltage signal Vc given to the driver 21 of the DC voltage regulator 20 and the driving frequency Vf give to the driver 31 of the inverter 30.

It should be noted that the individual features disclosed herein can be suitably combined as necessary to realize a further modification which is still within the scope of the present invention.

This application is based upon and claims the priority of Japanese Patent Application No. 2003-36518, filed in Japan on Feb. 14, 2003, the entire contents of which are expressly incorporated by reference herein.

The invention claimed is:

1. A ballast for an electrodeless discharge lamp, said ballast comprising:
   an induction coil adapted in use to be disposed adjacent to said discharge lamp;
   a high frequency power supply supplying a high frequency electric power to said induction coil for operating said lamp; and
   a dimmer controller which, in response to a dimmer command designating a varying dimming ratio, generates a control signal defining a first period in which said power supply is controlled to apply a coil voltage of a first level to said induction coil for operating said lamp, said first period being followed by a second period in which said power supply is controlled to apply the coil voltage of a second level that is lower than said first level and fails to sustain the lamp,
   wherein said dimmer controller generates said control signal that defines, between said second period and said first period, a starting period in which said coil voltage increases continuously.

2. The ballast as set forth in claim 1, wherein
said control signal increases said coil voltage continuously, within said starting period, from said second level to a third level higher than said first level.

3. The ballast as set forth in claim 1, wherein
said control signal defines, in the end of said first period, a falling phase in which said coil voltage decreases continuously towards said second level.

4. The ballast as set forth in claim 1, wherein
said control signal decreases a duty ratio of said first period as said dimming ratio decreases to lower the luminance of said discharge lamp.

5. The ballast as set forth in claim 1, wherein
said control signal decreases the coil voltage of the first level as said dimming ratio decreases to lower the luminance of said discharge lamp.

6. The ballast as set forth in claim 1, wherein
said control signal increases the coil voltage of the second level as said dimming ratio decreases to lower the luminance of said discharge lamp.

7. The ballast as set forth in claim 1, wherein
said control signal decreases a duty ratio of said first period as said dimming ratio decreases to lower the luminance of said discharge lamp down to a predetermined level, and
said control signal decreases the coil voltage of the first level and said duty ratio as said dimming ratio decreases to lower the luminance of said discharge lamp further beyond said predetermined level.

8. The ballast as set forth in claim 1, wherein
said control signal decreases a duty ratio of said first period as said dimming ratio decreases to lower the luminance of said discharge lamp down to a predetermined level, and
said control signal increases the coil voltage of the second level and decreases said duty ratio as said dimming ratio decreases to lower the luminance of said discharge lamp further beyond said predetermined level.

9. The ballast as set forth in claim 1, wherein
the coil voltage at the beginning of said starting period increases as said dimming ratio increases to raise the luminance of said discharge lamp.

10. The ballast as set forth in claim 1, wherein
said control signal further defines a pre-starting period immediately preceding said starting period, said pre-staring period giving the coil voltage that increases within a range between said second level and said first level as said dimming ratio decreases to lower the luminance of said discharge lamp.

11. The ballast as set forth in claim 10, wherein
said pre-starting period gives the coil voltage increasing continuously from said second level.

12. The ballast as set forth in claim 2, wherein
said control signal increases said third level as the dimming ratio decreases to lower the luminance of said discharge lamp.

13. The ballast as set forth in claim 12, wherein
said control signal gives the first level which decreases continuously from said third level during said first period.

14. The ballast as set forth in claim 1, wherein
said high frequency power supply includes a resonant circuit which generates said coil voltage determined by a driving frequency applied to said resonant circuit,
said control signal varying said driving frequency to regulate said coil voltage.

15. The ballast as set forth in claim 1, further including:
a DC power supply providing a DC voltage input to said high frequency power supply,
said control signal varying said DC voltage input for regulating said coil voltage.

16. The ballast as set forth in claim 1, wherein
said high frequency power supply includes a resonant circuit which generates said coil voltage determined by a driving frequency applied to said resonant circuit,
a DC power supply being included to provide a DC voltage to said high frequency power supply,
said control signal varying said driving frequency as well as said DC voltage in order to regulate said coil voltage.

17. The ballast as set forth in claim 14, wherein
said driving frequency is within a range from several tens of kHz to several MHz.

* * * * *